United States Patent
Olejarz et al.

(10) Patent No.: US 11,726,782 B2
(45) Date of Patent: Aug. 15, 2023

(54) ASSESSING AND AUDITING RELEASE READINESS FOR A SOFTWARE APPLICATION

(71) Applicant: FMR LLC, Boston, MA (US)

(72) Inventors: Maureen Olejarz, Westborough, MA (US); Venkatesh Yerramsetty, Flower Mound, TX (US); Sancho Chittillappily Sebastine, Lewisville, TX (US); Aravind Arumugham, Chennai (IN); Shubham Dhanuka, Muzaffarpur (IN); Cameron Keith, Dallas, TX (US); Natalia Potochniak, Raleigh, NC (US); Xinxing Zeng, Dalian (CN); Narasimha Mannepalli, Naguluppalapadu (IN)

(73) Assignee: FMR LLC, Boston, MA (US)

( * ) Notice: Subject to any disclaimer, the term of this patent is extended or adjusted under 35 U.S.C. 154(b) by 182 days.

(21) Appl. No.: 17/390,812

(22) Filed: Jul. 30, 2021

(65) Prior Publication Data

US 2023/0029624 A1 Feb. 2, 2023

(51) Int. Cl.
 *G06F 8/77* (2018.01)
 *G06F 21/57* (2013.01)
 *G06F 8/71* (2018.01)

(52) U.S. Cl.
 CPC .......... *G06F 8/77* (2013.01); *G06F 8/71* (2013.01); *G06F 21/577* (2013.01)

(58) Field of Classification Search
 CPC ............ G06F 8/71; G06F 8/77; G06F 21/577
 See application file for complete search history.

(56) References Cited

U.S. PATENT DOCUMENTS

| | | | |
|---|---|---|---|
| 7,788,536 B1 | 8/2010 | Qureshi et al. | |
| 9,141,378 B2 | 9/2015 | Fox et al. | |
| 10,108,917 B2 | 10/2018 | Philip et al. | |
| 10,146,524 B1 * | 12/2018 | Killmon | G06F 8/65 |
| 10,459,694 B2 | 10/2019 | Chakinam et al. | |
| 10,740,096 B2 | 8/2020 | Crabtree et al. | |
| 11,113,185 B2 * | 9/2021 | Sandhu | G06F 8/71 |
| 11,403,094 B2 * | 8/2022 | Mirantes | G06F 8/71 |
| 11,561,784 B2 * | 1/2023 | Wiegley | H04L 67/51 |

(Continued)

Primary Examiner — Douglas M Slachta
(74) Attorney, Agent, or Firm — Cesari & McKenna, LLP

(57) ABSTRACT

Methods and apparatuses are described for assessing and auditing release readiness for a software application. A server receives identification of a software application to be deployed to a production computing environment. The server determines technical attributes of the identified software application from application lifecycle management tools. The server selects one or more release readiness assessment criteria corresponding to the identified software application. The server applies the technical attributes of the identified software application to the release readiness assessment criteria to generate a release readiness score for the software application. The server deploys the identified software application to the production computing environment when the release readiness score is at or above a predetermined threshold. The server prevents deployment of the identified software application to the production computing environment when the release readiness score is below the predetermined threshold.

22 Claims, 14 Drawing Sheets

(56) References Cited

U.S. PATENT DOCUMENTS

| | | | |
|---|---|---|---|
| 2009/0019420 A1* | 1/2009 | Johnson | G06F 8/36 |
| | | | 717/101 |
| 2017/0180487 A1* | 6/2017 | Frank | G06F 11/3688 |
| 2018/0046455 A1 | 2/2018 | Walsh et al. | |
| 2018/0136951 A1* | 5/2018 | Palavalli | G06F 9/44505 |
| 2018/0275986 A1* | 9/2018 | Ghosh | G06F 8/60 |
| 2018/0293158 A1* | 10/2018 | Baughman | G06F 11/3692 |
| 2019/0361688 A1* | 11/2019 | Chigakkagari | G06F 11/302 |
| 2020/0133661 A1 | 4/2020 | Alexander | |
| 2022/0342663 A1* | 10/2022 | Barkaee | G06F 8/77 |

\* cited by examiner

FIG. 4

Change Management

Ckt Ticket Number
CM123456

Status
Closed Complete

Start date
05/13/2020

End date
05/13/2020

Type
Normal

Risk
Moderate

Requested by

Category
Application

Subcategory
Installation

Change Trigger
Business Requirement

The purpose of this install is to re-hydrate the Distribution Tax Rules application.

Squad Details

Release Auditability

OsPro Regulatory Compliance

TLM Compliance Rules

- TECHNOLOGIES
  PASSED
  DESCRIPTION:
  Technologies used in the application cannot be Obsolete nor End of Life.

Technologies
  See in table below

- LIFECYCLE STAGE
  PASSED
  DESCRIPTION:
  The application's Lifecycle Stage cannot be 'Concept' nor 'Acquisition', and have production deployments or production incidents. In that case, 'Lifecycle Stage' should be set to 'Production' in SNOW.

Lifecycle Stage
  Production

- INVESTMENT POSTURE
  PASSED
  DESCRIPTION:
  If Investment Posture is 'Sell', Lifecycle Stage has to be 'Retirement Ready', and Planned Retirement Date has to be set.

Investment Posture          Lifecycle Stage          Planned Retirement Date
  Buy                         Production               (no date)

| STATUS | TECHNOLOGY | CURRENT PHASE | NEXT PHASE | TIME UNTIL NEXT PHASE | NEW SOFTWARE MODEL (OR DECOMMISSION) | REMEDIATION |
|---|---|---|---|---|---|---|
| ● | Oracle Java Runtime Environment (JRE) 1.8 | Upgrade | Obsolete | 1 Year 7 Months 24 Days | | |
| ● | LWC 1.2.35 | Generally Available | Unknown | | | |

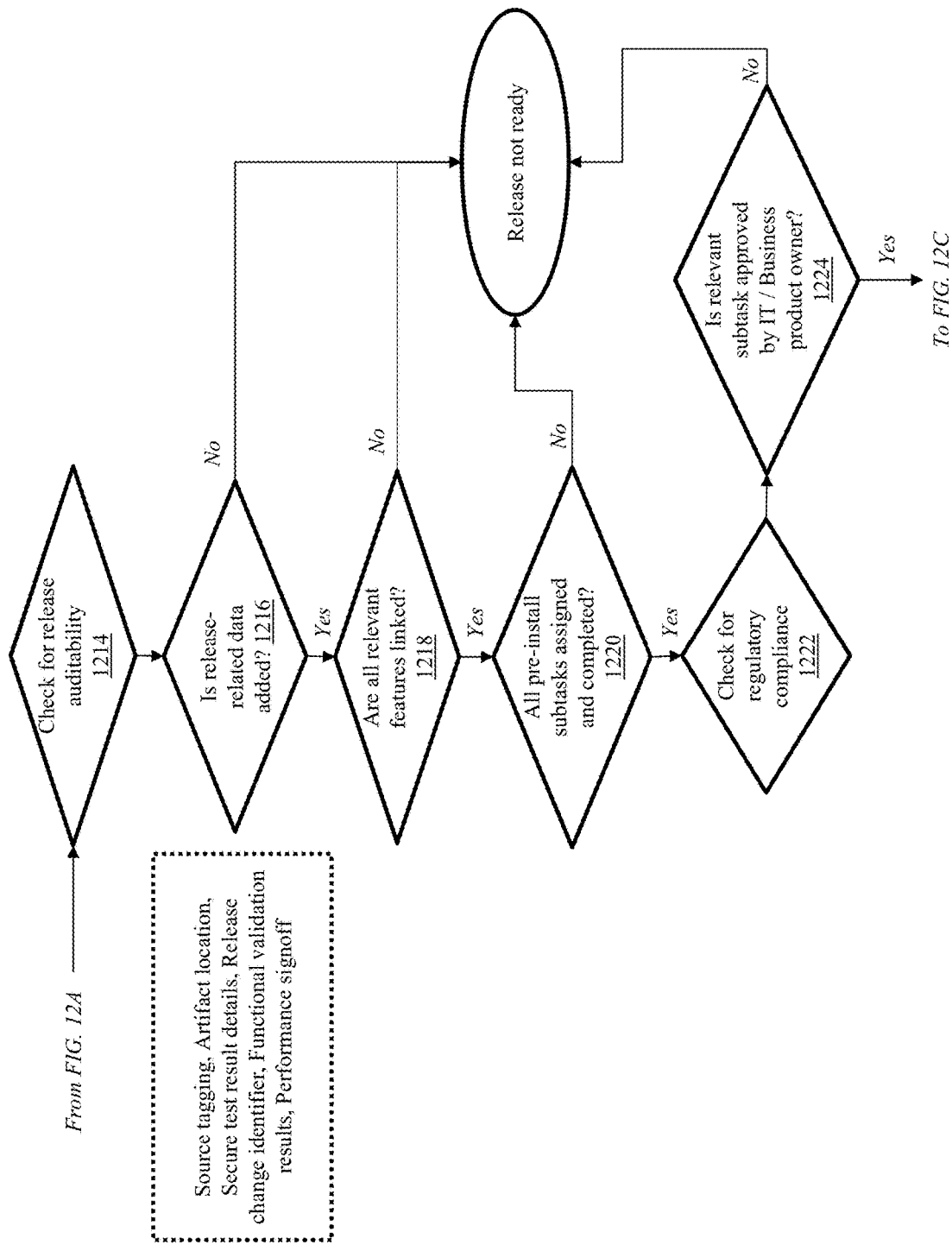

ASSESSING AND AUDITING RELEASE READINESS FOR A SOFTWARE APPLICATION

TECHNICAL FIELD

This application relates generally to methods and apparatuses, including computer program products, for assessing and auditing release readiness for a software application.

BACKGROUND

Most medium and large technology organizations develop and deploy software applications to production computing environments on a regular basis. Due to the complexity of the software applications, they often undergo a series of analyses and tests to ensure that deployment will not result in service errors or application downtime. In addition, in certain industries (i.e., financial services), such software deployments are subject to an additional level of review for compliance with governmental and/or regulatory requirements (e.g., FINRA). In many cases, it is crucial for organizations to be able to quickly and efficiently audit specific software applications prior to deployment to ensure compliance and stability.

However, with many different developers and teams working on various aspects of a particular software application—including issue tracking, change management tickets, development stories, source code check-ins, and the like—in combination with the technical requirements for application deployment (e.g., cloud vs. backend, hardware platform, lifecycle of application, etc.), it is very difficult to get a complete assessment of the release readiness of a particular software application and/or code change prior to deployment. In addition, the ability to share the release readiness assessment information after a software deployment is completed is very limited, at least because the readiness check has already been. And, in order to determine release readiness between one or more inter-dependent computing systems, the release readiness check is typically performed manually and thus is prone to error.

SUMMARY

Therefore, what is needed are methods and systems that provide for systematic software application release auditability, including automation of data collection and readiness analysis for each code release and provision of a user interface that can make software application audits simple to execute and review. In some aspects, the techniques described herein can provide a release readiness assessment prior to deployment of an application—to enable development teams to understand problem areas for a software application and prevent production computing environment issues that result from deployment of deficient software. Also, the systems and methods described herein can advantageously automate the software deployment process based upon a release readiness score generated by the system—so that applications ready to be deployed are introduced into production while applications that are not ready are automatically blocked from deployment. In other aspects, the techniques described herein can provide a release readiness assessment after deployment of an application to a production computing environment—to enable development teams to respond to audit requests in a timely fashion and with the complete information needed. As a result, the systems and methods of the present disclosure beneficially capture information at every relevant stage of software development which is used for determining release readiness. The captured information is retained at each deployment level and ready to be retrieved via user interface, and the capability is designed such a way that future compliance requirements can be quickly and efficiently integrated into the system, so as to avoid being limited to current tools and compliance efforts.

The invention, in one aspect, features a system for assessing and auditing release readiness for a software application. The system includes a server computing device with a memory that stores computer-executable instructions and a processor that executes the computer-executable instructions. The server computing device receives identification of a software application to be deployed to a production computing environment. The server computing device determines a plurality of technical attributes of the identified software application from one or more application lifecycle management (ALM) tools, including at least a source code management system. The server computing device selects one or more release readiness assessment criteria corresponding to the identified software application. The server computing device applies the plurality of technical attributes of the identified software application to the release readiness assessment criteria to generate a release readiness score for the software application. The server computing device deploys the identified software application to the production computing environment when the release readiness score is at or above a predetermined threshold. The server computing device prevents deployment of the identified software application to the production computing environment when the release readiness score is below the predetermined threshold.

The invention, in another aspect, features a computerized method of assessing and auditing release readiness for a software application. A server computing device receives identification of a software application to be deployed to a production computing environment. The server computing device determines a plurality of technical attributes of the identified software application from one or more application lifecycle management (ALM) tools, including at least a source code management system. The server computing device selects one or more release readiness assessment criteria corresponding to the identified software application. The server computing device applies the plurality of technical attributes of the identified software application to the release readiness assessment criteria to generate a release readiness score for the software application. The server computing device deploys the identified software application to the production computing environment when the release readiness score is at or above a predetermined threshold. The server computing device prevents deployment of the identified software application to the production computing environment when the release readiness score is below the predetermined threshold.

Any of the above aspects can include one or more of the following features. In some embodiments, the identification of a software application to be deployed to a production computing environment is received from a client computing device. In some embodiments, the identification of a software application to be deployed to a production computing environment is automatically selected based upon a change management ticket received from a software development management system. In some embodiments, the plurality of technical attributes of the identified software application comprise an application type, a migration path, an installation type, a source code repository identification, a deployment structure, and a cloud service provider identification.

In some embodiments, the one or more ALM tools comprise a software development management system, a source code vulnerability assessment system, a software security risk compliance system, a data warehouse system, and a software image management system. In some embodiments, at least one of the one or more release readiness assessment criteria is based upon a regulatory requirement. In some embodiments, the server computing device determines one or more regulatory-related attributes of the identified software application from the one or more ALM tools and applies the one or more regulatory-related attributes of the identified software application to the release readiness criteria to update the release readiness score.

In some embodiments, the server computing device generates one or more release readiness user interface screens based upon the application of the plurality of technical attributes of the identified software application to the release readiness assessment criteria and displays the release readiness user interface screens on a client computing device. In some embodiments, when deployment of the identified software application to the production computing environment is prevented, the server computing device generates a notification message and transmits the notification message to one or more remote computing devices.

In some embodiments, the server computing device stores at least the release readiness score for each software application in an archival database. In some embodiments, deploying the identified software application to the production computing environment comprises transferring one or more files of the identified software application to a computing device in the production computing environment and making functionality of the identified software application available to one or more remote computing devices.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of an exemplary release readiness assessment overview UI generated by the system.

FIG. 5 is a diagram of an exemplary change management information UI generated by the system.

FIG. 6 is a diagram of an exemplary release auditability UI generated by the system.

FIG. 8 is a diagram of an exemplary TLM compliance rules UI generated by the system.

FIG. 10 is a diagram of an exemplary security analysis UI generated by the system.

FIGS. 12A-12C comprise a use case flow diagram of an exemplary computerized method of assessing and auditing release readiness for a software application.

DETAILED DESCRIPTION

Figure 1:
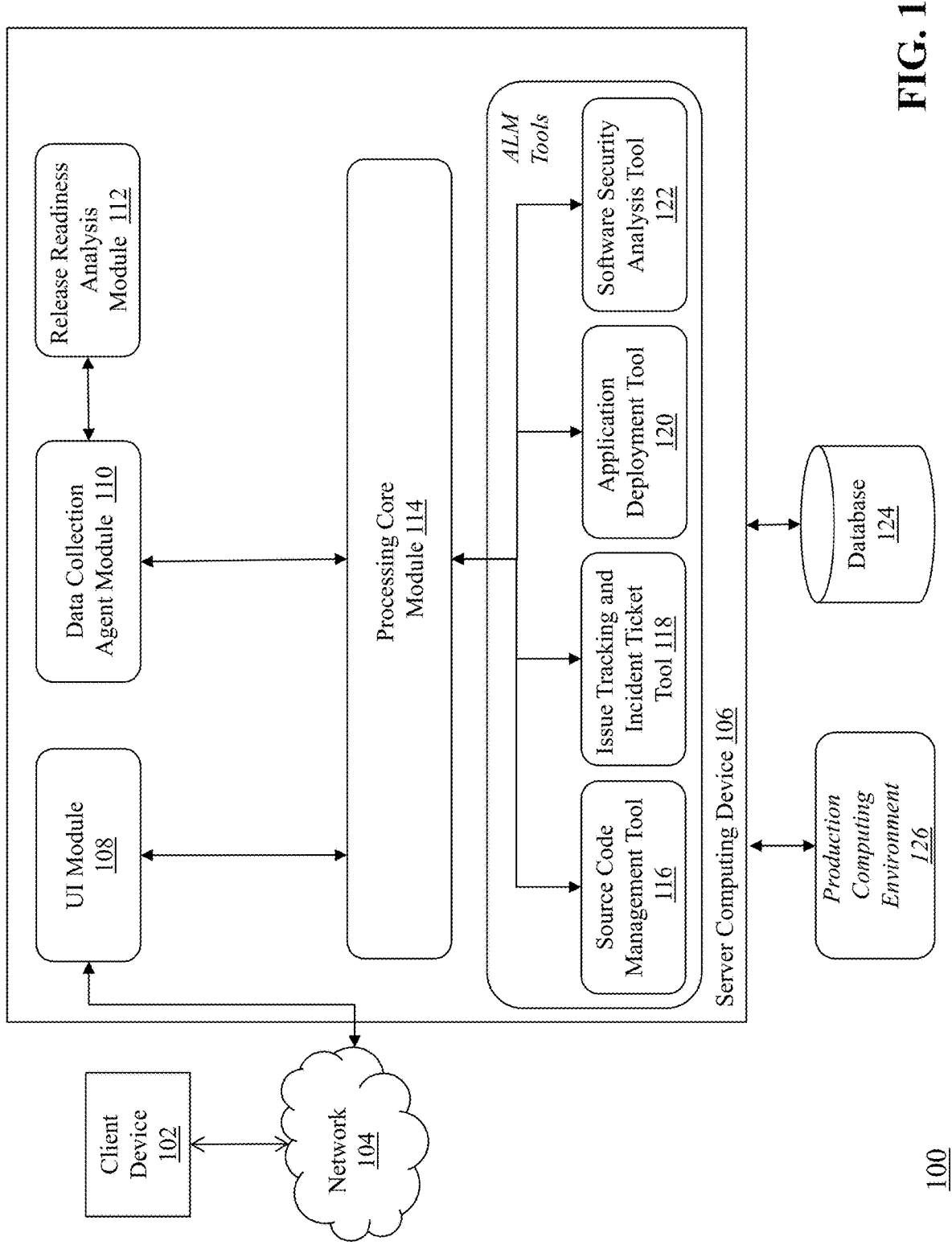
FIG. 1 is a block diagram of a system for assessing and auditing release readiness for a software application.

FIG. 1 is a block diagram of a system 100 for assessing and auditing release readiness for a software application. As described herein, a 'software application' to be deployed to a production environment should be understood as including an entire executable application and/or certain elements of functionality (e.g., a module, a library, a code update) that is less than an entire executable software application. The system 100 includes one or more client computing devices (e.g., client device 102) that is coupled via communications network 104 to the server computing device 106. The server computing device 106 includes a user interface (UI) module 108, a data collection agent module 110, a release readiness analysis module 112, a processing core module 114, and a plurality of application lifecycle management (ALM) tools 116, 118, 120, 122. The server computing device is coupled to a database 124 and a production computing environment 126.

The client computing device 102 connects to the communications network 104 in order to communicate with the server computing device 106 to provide input and receive output relating to the process of assessing and auditing release readiness for a software application as described herein. The client computing device 102 is coupled to a display device (not shown). For example, the client computing device 102 can provide a detailed graphical user interface (GUI) via the display device that presents output resulting from the methods and systems described herein, where the GUI is utilized by an operator to review data associated with the process of assessing and auditing release readiness for a software application.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communication network 104 enables the other components of the system 100 to communicate with each other in order to perform the process of assessing and auditing release readiness for a software application as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as UI module 108, data collection agent module 110, release readiness analysis module 112, processing core module 114, and one or more ALM tools (as shown in FIG. 1, a source code management tool 116, an issue tracking and incident ticket tool 118, an application deployment tool 120, and a software security analysis tool 122)—that execute on the processor of the server computing device 106, to receive data from other components of the system 100, transmit data to other components of the system 100, and perform functions for assessing and auditing release readiness for a software application as described herein.

In some embodiments, the modules and tools 108 through 122 are specialized sets of computer software instructions programmed onto a dedicated processor in the server computing device 106 and can include specifically-designated memory locations and/or registers for executing the specialized computer software instructions. Further explanation of the specific processing performed by the modules and tools 108 through 122 will be provided throughout the specification.

Generally, the source code management tool 116 is configured to store and manage software application code files, artifacts, libraries, version control mechanisms, function calls, configuration files, metadata, and other elements that make up one or more software applications. In some embodiments, all or a portion of the source code management tool 116 can be integrated within the server computing device 106 (as shown in FIG. 1) or be located on a separate computing device or devices. In some embodiments, the source code management tool 116 is hosted on one or more remote computing devices (e.g., cloud-based architecture) that are accessible to the server computing device 106. Exemplary source code management tools include, but are not limited to, Atlassian Bitbucket Server™ (available from Atlassian Inc.) or Mercurial (available from mercurial-scm.org).

Generally, the issue tracking and incident ticket tool 118 is configured to enable the management of software development project tasks and related timelines, and to track defects, bugs, and other issues with software releases as developers work on the code. In some embodiments, all or a portion of the issue tracking and incident ticket tool 118 can be integrated within the server computing device 106 (as shown in FIG. 1) or be located on a separate computing device or devices. In some embodiments, the issue tracking and incident ticket tool 118 is hosted on one or more remote computing devices (e.g., cloud-based architecture) that are accessible to the server computing device 106. Exemplary issue tracking and incident ticket tools include, but are not limited to, Atlassian JIRA™ (available from Atlassian Inc.), Microsoft® Azure DevOps™ (available from Microsoft Corp.) or Splunk™ (available from splunk.com).

Generally, the application deployment tool 120 is configured to manage the automation of software application build generation (i.e., creating an executable version of a software application from the corresponding source code files) and deploying the executable software application to a production computing environment 126. In some embodiments, all or a portion of the application deployment tool 120 can be integrated within the server computing device 106 (as shown in FIG. 1) or be located on a separate computing device or devices. In some embodiments, the application deployment tool 120 is hosted on one or more remote computing devices (e.g., cloud-based architecture) that are accessible to the server computing device 106. Exemplary application deployment tools 120 include, but are not limited to, Jenkins™ (available from jenkins.io) or IBM® UrbanCode Deploy™ (uDeploy) (available from IBM Corp.).

Generally, the software security analysis tool 122 is configured to perform detailed analysis and testing of source code files to identify flaws and weaknesses in the software application that could be used to compromise the integrity or security of the application. In some embodiments, all or a portion of the software security analysis tool 122 can be integrated within the server computing device 106 (as shown in FIG. 1) or be located on a separate computing device or devices. In some embodiments, the software security analysis tool 122 is hosted on one or more remote computing devices (e.g., cloud-based architecture) that are accessible to the server computing device 106. Exemplary software security analysis tools 122 include, but are not limited to, the Veracode™ application analysis solution (available from veracode.com) or the Checkmarx™ software security platform (available from checkmarx.com).

The database 124 comprises transient and/or persistent memory for data storage, that is used in conjunction with the process of assessing and auditing release readiness for a software application as described herein. In some embodiments, the database 124 is a computing device (or in some embodiments, a set of computing devices) coupled to the server computing device 106 and is configured to receive, generate, and store specific segments of data relating to the process of assessing and auditing release readiness for a software application as described herein. In some embodiments, all or a portion of the database 124 can be integrated with the server computing device 106 or be located on a separate computing device or devices. The database 124 can comprise one or more databases configured to store portions of data used by the other components of the system 100, as will be described in greater detail below.

The production computing environment 126 is coupled to the server computing device 106 and is configured to provide software application functionality to end users. Typically, once a software application under development is determined to be ready for release, the server computing device 106 (via, e.g., the application deployment tool 120) provides an executable software application for deployment and installation in the production computing environment 126. Generally, the production computing environment 126 can comprise one or more server computing devices that are located remotely from the server computing device 106 (e.g., in a networked and/or cloud-based architecture) or in some embodiments, one or more server computing devices that comprise the production computing environment 126 can be provided in the same physical location as the server computing device 106.

Finally, it should be appreciated that the above-referenced ALM tools 116, 118, 120, 122 are exemplary, and that other types of ALM tools can be included in the system 100 for the purposes of assessing and auditing release readiness for a software application as described herein.

Figure 2:
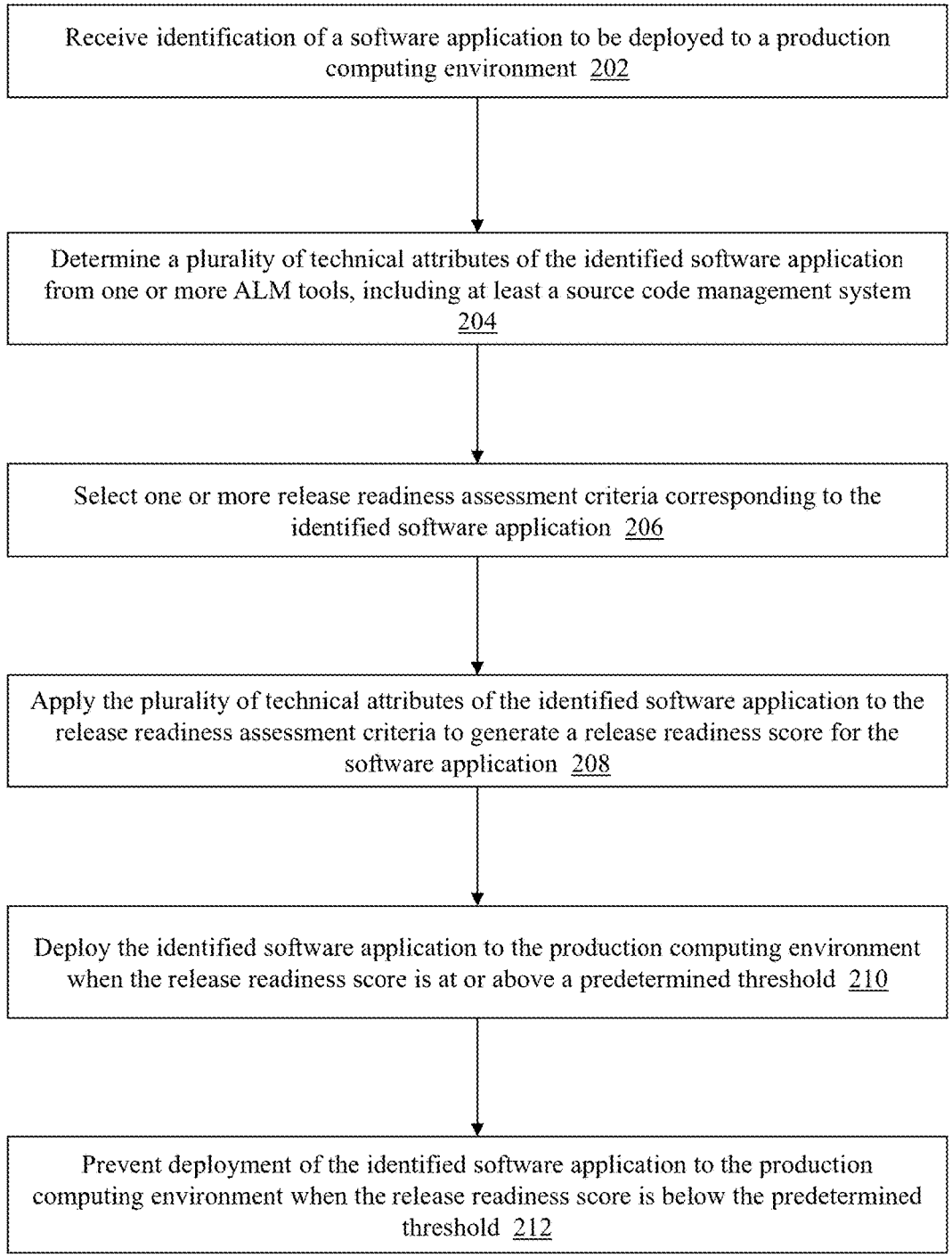
FIG. 2 is a flow diagram of a computerized method of assessing and auditing release readiness for a software application.

FIG. 2 is a flow diagram of a computerized method 200 of assessing and auditing release readiness for a software application, using the system 100 of FIG. 1. The data collection agent module 110 of server computing device 106 receives (202) identification of a software application to be deployed to a production computing environment (e.g., environment 126). In one example, a user at client device 102 connects to the UI module 108 of server computing device 106 and selects a software application for deployment to the production computing environment 126. To perform the selection of a software application, the user can enter an application ID associated with the software application into a UI provided by the UI module 108 and the data collection agent module 110 can identify the software application that is linked to the application ID. In some embodiments, the UI further provides for the user to enter a change management ticket ID (e.g., instead of the application ID) and the data collection agent module 110 can retrieve a list of application IDs from the change management ticket for selection by the user. This scenario may be useful in a case where a change management ticket is associated with changes to multiple different software applications.

In some embodiments, the UI module 108 communicates via the processing core module 114 with one or more of the ALM tools, such as the source code management tool 116 and/or the application deployment tool 120, to identify a list of prospective software applications that are eligible to be deployed to the production computing environment 126 (based on, e.g., a determination of build status, approval to deploy, etc.) and either transmit the list to the client device 102 for selection by the user or automatically select one of the software applications on the list. For example, the data collection agent module 108 can analyze development and/or deployment information contained in one or more of the ALM tools, such as a change management ticket generated by the source code management tool 116, to determine that a given software application is eligible to be deployed to the production computing environment 126. In this example, the change management ticket may indicate that the software application has been modified, with changes to the code recently checked in and validated by the development team. As a result, the data collection agent module 108 can determine that the software application is ready to be deployed to the production computing environment 126 and select the application for a release readiness review as described herein.

The data collection agent module 110 connects to one or more of the ALM tools 116, 118, 120, 122 to determine (204) a plurality of technical attributes of the identified software application that was identified in step 202. For example, the data collection agent module 110 connects via the processing core module 114 to the source code management tool 116 and collects technical attributes relating to the software application that may be used by the release readiness analysis module 112 to generate a score relating to whether the software application is ready for deployment—or whether there may be bugs, security flaws, compliance risks (e.g., as related to governmental or organization requirements/standards), or other deficiencies that would make deployment of the software application unadvisable or unavailable. The technical attributes that may be collected from the ALM tools can include, but are not limited to, an application type (e.g., web service, business application, microsite, batch process, etc.), a migration path (e.g., replatform), an installation type, a source code repository identification, a deployment structure, and a cloud service provider identification. It should be appreciated that other types of technical attributes of the software application can be part of the collection and analysis described herein. In some embodiments, instead of going directly to each of the ALM tools to retrieve the technical attributes, the data collection agent module 110 can leverage a centralized platform that manages application development and workflow data (e.g., as a separate ALM tool and/or stored in database 124)—such as the ServiceNow™ platform (available at servicenow.com). For example, the application data in the centralized platform can be retrieved from the various ALM tools and synchronized into the database 124 on a periodic basis. As a result, the data collection agent module 110 does not need to perform a plurality of different data retrieval processes (e.g., one for each ALM tool) every time that a new software application is identified for release readiness and deployment.

In another example, one or more of the software applications under development can be registered with a Self Service Production Deployment (SSPD) system coupled to the server computing device 106, and the data collection agent module 110 can utilize the data contained in the SSPD system to determine one or more technical attributes for the software application. For example, when a software application is registered in the SSPD system, the application can provide details relating to, e.g., last production deployment of the application, source code quality metrics (such as from Sonar™, Stash™, etc.). The data collection agent module 110 can retrieve these technical attributes from the SSPD system.

Another important aspect of the technical attributes of some software applications is whether the application must be in compliance with certain regulatory requirements (e.g., SEC, FINRA, etc.). For example, if a software application is used by broker/dealers, it may be subject to compliance with governmental standards or other regulatory requirements. Therefore, the data collection agent module 110 can determine whether the identified software application is subject to such regulatory requirements and collect necessary technical attributes of the software application for analysis by the release readiness analysis module 112. Once type of regulatory analysis that can be performed is OpsPro Regulatory Compliance, which requires that for broker/dealer covered applications, all software changes for production environments must be reviewed and approved by certain management personnel, such as a Business Product Manager or IT Product Manager. The data collection agent module 110 can retrieve certain information from one or more of the ALM tools (such as the source code management tool 116) that indicates whether the required manager(s) have signed off on the code changes. In one example, the module 110 can capture details from a Release JIRA entry for the software application that are provided to the release readiness analysis module 112—such as enabling the module 112 to determine whether a subtask (e.g., "Change reviewed and approved by Business Product Manager or IT Product Manager") has been property assigned and is marked Done.

The data collection agent module 110 transmits the plurality of technical attributes for the identified software application to the release readiness analysis module 112, so that the module 112 can generate a release readiness score based upon one or more release readiness assessment criteria, as described below. The release readiness analysis module 112 selects (206) one or more release readiness assessment criteria corresponding to the identified software application. Generally, the release readiness assessment criteria correspond to the technical attributes of the identified software application—such that the release readiness analysis module 112 can prioritize the evaluation of attributes that are relevant to determining whether to deploy the software application to the production computing environment 126. For example, if a software application will be deployed in a cloud-based computing environment (e.g., Amazon® AWS™ platform), the release readiness assessment criteria for the identified software application can comprise one or more criteria for analyzing the migration path, the deployment structure, and other similar technical attributes to confirm whether they meet the requirements for cloud deployment. Whereas, in another example, if the identified software application will be deployed in a backend database system, the release readiness assessment criteria can comprise other criteria that do not relate to a cloud-based deployment, and so forth.

Generally, the release readiness assessment criteria can be distributed into a number of different categories: Release Auditability, Regulatory Compliance, Technology Lifecycle Management (TLM), Quality, Security, Rehydration, and Cloud Governance. Release Auditability relates to analyzing whether the issue tracking information for the software application, as obtained from the issue tracking and incident ticket tool 118 (e.g., JIRA), is populated, linked to a product release, and subtasks are complete. Regulatory Compliance relates to analyzing whether the software application is broker/dealer covered (as mentioned above, meaning that it includes functionality that may be subject to additional regulatory requirements) and if so, whether the application meets those requirements. TLM relates to analyzing whether the software application uses any obsolete or end-of-life technology, whether the lifecycle of the application is production or planned retirement, technical stack implementation details for the application, and the like. Quality relates to analyzing one or more source code quality checks on the software application based upon information contained in, e.g., the source code management tool 116. Security relates to analyzing one or more security compliance test results based upon information contained in, e.g., the software security analysis tool 122. Rehydration relates to analyzing one or more attributes of the software application relating to data rehydration in production to determine whether there are any non-compliant images in the production computing environment. Cloud Governance relates to analyzing application details and/or artifact details to determine whether release of the application complies with Cloud Governance guidelines.

In some embodiments, the release readiness assessment criteria can include other categories of information and metadata, including but not limited to incident data (e.g., recent incidents related to deployment of the application to production), deployment data (e.g., identify any/all recent installs of the application), and other types of information. This information can be incorporated into the above-referenced categories as well.

Once the technical attributes for the software application and the corresponding release readiness assessment criteria are identified and captured, the release readiness analysis module 112 applies (208) the plurality of technical attributes of the identified software application to the release readiness assessment criteria to generate a release readiness score for the software application. In this context, the release readiness score is an indicator of whether the software application is ready for deployment to the production computing environment 126. As can be appreciated, the technical attributes of a software application—alone or in combination with certain development details—can provide information of the potential impact that deployment of a software application would have on the production environment. For example, an application that is deployed on critical computing systems and/or that has functionality which could expose a security risk if not properly implemented might be subject to a more stringent release readiness analysis than a software application that is expected to have minimal impact on the production environment.

In some embodiments, the release readiness assessment criteria comprises a set of rules that are evaluated by the release readiness analysis module 112, using the captured information about the software application, to identify whether the software application is ready for deployment to the production computing environment (or whether the application should be prevented from deployment). For example, each of the technical attributes captured by the system 100 can be allocated to one or more of the release readiness assessment criteria to determine whether the criteria are met—in the form of a release readiness score. In some embodiments, the release readiness score is a binary value, meaning that if at least one of the release readiness assessment criteria are not met, the release readiness score is 0 (i.e., the application should not be deployed). Conversely, if all of the criteria are met, the release readiness score is 1 (i.e., the application is ready for deployment).

In other embodiments, the release readiness score is a numeric value comprised of a multi-faceted analysis of the release readiness assessment criteria. For example, in some embodiments, the release readiness analysis module 112 can apply a weighted factorization algorithm to each of the assessment criteria (or at least some of the assessment criteria) to emphasize particular criteria that are of greater importance to deployment. It should be appreciated that certain technical attributes of a given software application may have a greater impact on the stability, security, performance, reliability, etc. of the software application in a production computing environment. The release readiness analysis module 112 can be configured to weigh certain technical attributes and/or release readiness assessment criteria more heavily than others because those technical attributes (if not properly configured) would negatively impact the software application in production. Therefore, the module 112 applies an increased weight to those criteria in determining the release readiness score—such that an application may still be deployed to production if less-impactful criteria are not met, but an application likely would not be deployed to production if certain high-impact criteria are not met.

In some embodiments, the data collection agent module 110 and/or the release readiness analysis module 112 can aggregate some or all of the release readiness assessment criteria from the various ALM tools 116, 118, 120, 122 (and/or other tools) and capture the criteria into a data structure corresponding to a new JIRA issue type (e.g., 'Release') for implementation in the issue tracking and incident ticket tool 118. In this way, the new JIRA issue type can be the reference point for the release readiness analysis module 112 to evaluate the readiness of the software application to be deployed, generate the release readiness score, and determine whether to deploy the application to the production computing environment 126.

FIGS. 3-11 are screenshots of exemplary user interfaces (UIs) generated by the UI module 108 in conjunction with the data collection agent module 110 and/or the release readiness analysis module 112 to depict the results of the application of the release readiness assessment criteria to the technical attributes of the software application and generate of the release readiness score.

Figure 3:
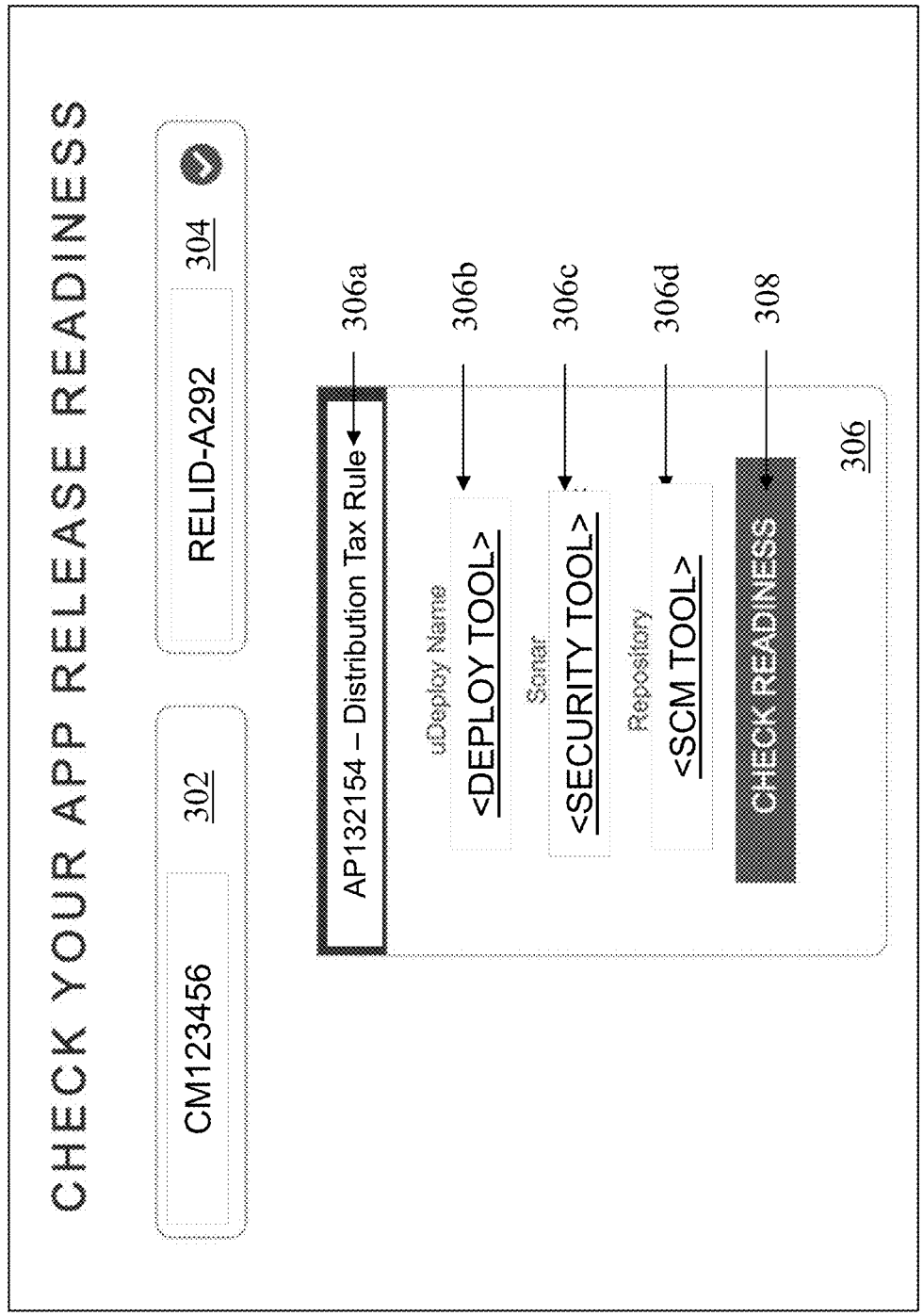
FIG. 3 is a diagram of an exemplary release readiness initiation UI generated by the system.

FIG. 3 is a diagram of an exemplary release readiness initiation UI generated by the system 100. As mentioned above, a user at client device 102 can connect to the server computing device 106 in order to initiate an analysis of a particular software application (and/or software functionality) to determine if the application is ready to be deployed to the production computing environment 126. The UI module 108 in conjunction with the data collection agent module 110 and/or the release readiness analysis module 112 can generate the UI shown in FIG. 3, which includes one or more input fields 302, 304, an application information box 306 and a check readiness button 308. The user at client device 102 can enter an identifier (such as a change management ticket ID, which is associated with a particular software application in the issue tracking and incident ticket tool 118) in input field 302 and the system 100 can retrieve the necessary technical details from the ALM tools 116, 118, 120, 122 via the processing core module 114 and also obtain the corresponding release readiness criteria for the software application. In some embodiments, input field 304 can be used to display another identifier associated with the software application (e.g., a JIRA story ID) so that the user at client device 102 can confirm the correct application has been selected.

The UI module 108 can populate application information box 306 with relevant development and/or deployment information for the selected software application. For example, as shown in FIG. 3, the application information box 306 comprises an application ID and description 306a, a link 306b to the corresponding application deployment tool 120 (e.g., uDeploy) that is used to deploy the application to production, a link 306c to the corresponding software security analysis tool 122 (e.g., Sonar) that is used to check the code security and/or quality of the software application, and a link 306d to the corresponding source code management tool 116 (e.g., Atlassian Bitbucket Server™) that is used to manage the source code files for the software application. As noted above, the UI of FIG. 3 also includes a button 308 that can be clicked by the user of client device 102 to start the release readiness assessment process described herein.

Once the process is started, the release readiness analysis module 112 applies the release readiness assessment criteria to the technical attributes of the software application and generates a release readiness score, as described above. Upon completion of the assessment, the UI module 108 can generate one or more UI screens to display the results of the assessment. FIG. 4 is a diagram of an exemplary release readiness assessment overview UI generated by the system 100. As shown in FIG. 4, the UI includes information about the application identification (e.g., application name, application ID), regulatory compliance assessment (e.g., Cloud Approved, SOC1 App, Broker-Dealer Covered), technology lifecycle management details (e.g., life cycle stage), deployment information (e.g., Install Type, Migration Path, Cloud, External Facing), history information (e.g., Last Prod Deployment), and so forth. It should be appreciated that other types of application-related information can be included on the Application Overview screen.

In some embodiments, the Application Overview screen includes a plurality of additional information panels relating to specific aspects of the release readiness assessment. These information panels can reside below the Application Overview information and, when expanded by a user of the client device 102 (e.g., by clicking a user interface element such as a plus sign), provide further specific information regarding the application release readiness. FIGS. 5-11 are exemplary user interface information panels that are generated by the system 100 for providing additional information on the release readiness assessment.

FIG. 5 is a diagram of an exemplary change management information UI generated by the system 100. As shown in FIG. 5, the change management information UI includes data relating to the change management ticket(s) associated with the software application selected for deployment—such as state of the ticket (i.e., Closed Complete), start and end date of the change implementation, type of change (i.e., Normal), risk level of the change (i.e., Moderate), category and subcategory of the change (i.e., Application Installation), change trigger (i.e., Business Requirement) and a short description of the change (i.e., rehydration of the Distribution Tax Rules application). The user at client device 102 can analyze this information to understand more detail about the change that is scheduled to be deployed to the production computing environment 126.

Figure 6:
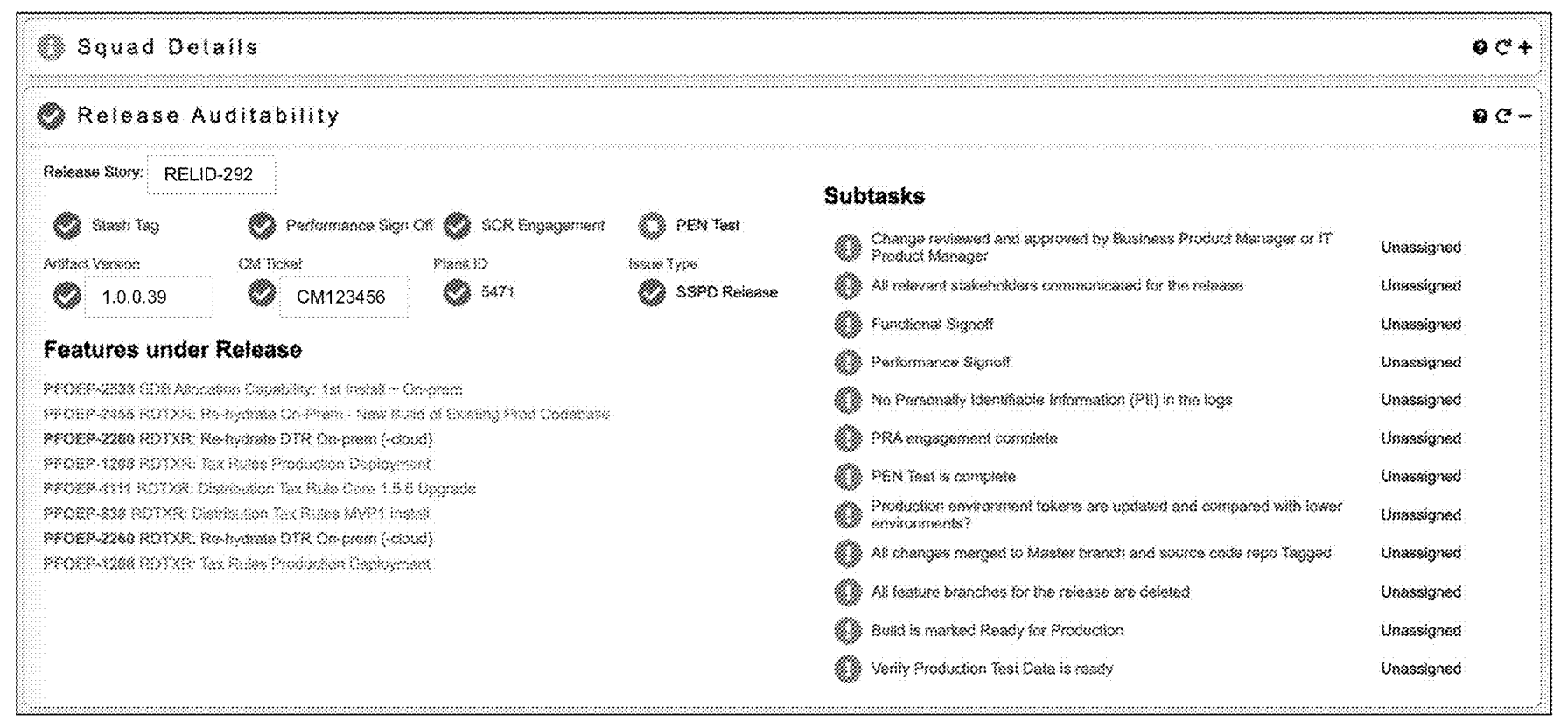

FIG. 6 is a diagram of an exemplary release auditability UI generated by the system 100. As shown in FIG. 6, the release auditability UI includes technical details regarding the software deployment (such as the specific features that are incorporated in the release, including the present CM ticket and JIRA story ID), and the like. In addition, the release auditability UI includes a list of release readiness subtasks that factor into the overall determination of whether the software application is ready for deployment to production—including if the subtasks have been assigned (e.g., for execution and completion) and whether the subtasks have been successfully completed. For example, when a subtask is complete, the exclamation point icon can be updated to reflect the status of the subtask (e.g., a checkmark for a positive outcome that suggests the subtask result does not present any issues for deployment, or an 'x' for a negative outcome that suggests the subtask result may present an issue for deployment). Using this interface, the user at client device 102 can quickly determine whether there are any subtasks left unresolved or that could be problematic for deploying the application to production.

Figure 7:
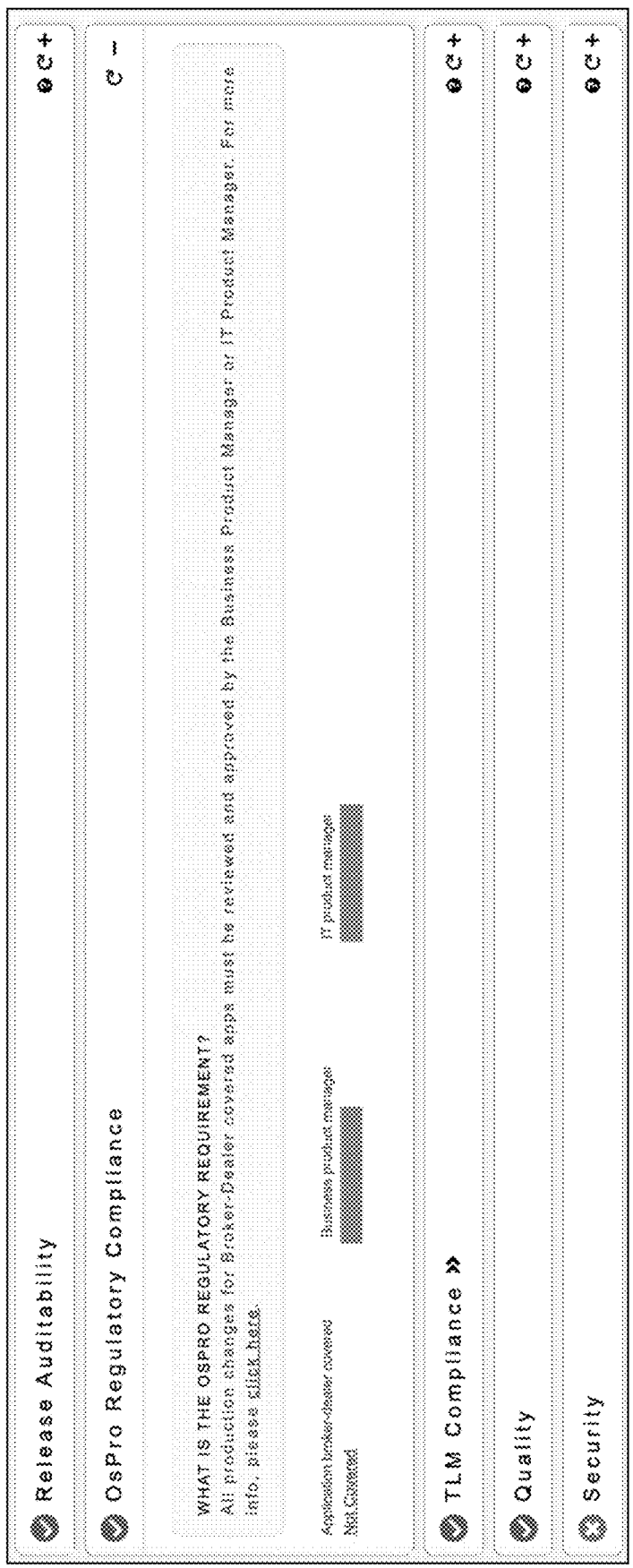
FIG. 7 is a diagram of an exemplary regulatory compliance UI generated by the system.

FIG. 7 is a diagram of an exemplary regulatory compliance UI generated by the system 100. As shown in FIG. 7, the regulatory compliance UI provides information relating to the assessment of whether the application requires review and approval by certain personnel (e.g., business product manager or IT product manager) due to functionality that must be in compliance with regulatory requirements. The user at client device 102 can see whether the application has been flagged for review and approval, and if so, whether such approval is complete. Based upon this information, in some embodiments the release readiness analysis module 112 can determine whether the application should be deployed or not, depending on the outcome of the review.

FIG. 8 is a diagram of an exemplary TLM compliance rules UI generated by the system 100. As shown in FIG. 8, the TLM compliance rules UI includes information relating to the life cycle status for certain software components and dependencies of the application software to be deployed. For example, the UI can include technical details about whether any of the technologies in the software are end-of-life and/or obsolete (or not), as well as an indicator ("Investment Posture") of the planned continued use of the software application (e.g., Buy=the software is planned for continued use in production with no specific retirement date; Sell=the software is expected to be retired and no longer in production by a specific retirement date). In some embodiments, if the software is planned for retirement and/or there are elements of the software application that are obsolete or end-of-life, the release readiness analysis module 112 can determine that the software application should not be deployed to production until such changes are made to fix any obsolescence or end-of-life components.

Figure 9:
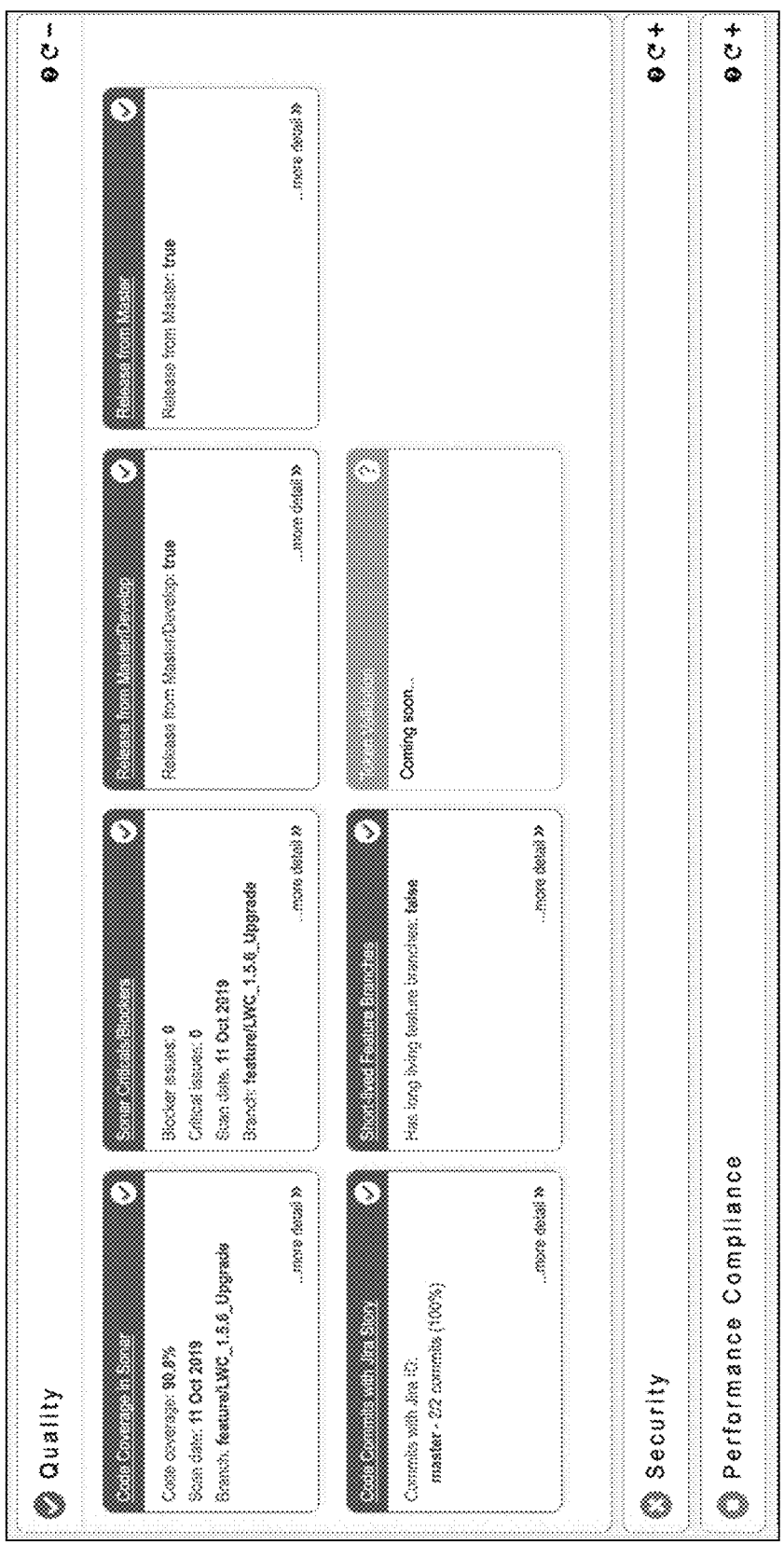
FIG. 9 is a diagram of an exemplary quality analysis UI generated by the system.

FIG. 9 is a diagram of an exemplary quality analysis UI generated by the system 100. As shown in FIG. 9, the quality analysis UI includes technical details about the code quality as obtained from the software security analysis tool 122 and further indications of release readiness as determined by the release readiness analysis module 112. For example, the quality analysis UI can present information relating to any critical issues or blocker issues present in the code base (as determined from tool 122), code coverage percentage, code commits, and the like. Each section of the UI can be associated with a visual indicator (e.g., as shown, a checkmark) indicating that the module 112 has determined there are no problems or alerts with respect to each category of information that would prevent the application from being deployed. It should be appreciated that in the scenario where an issue was detected by the system 100, the corresponding visual indicator would change (e.g., to an 'x' or exclamation point, etc.).

Figure 10:
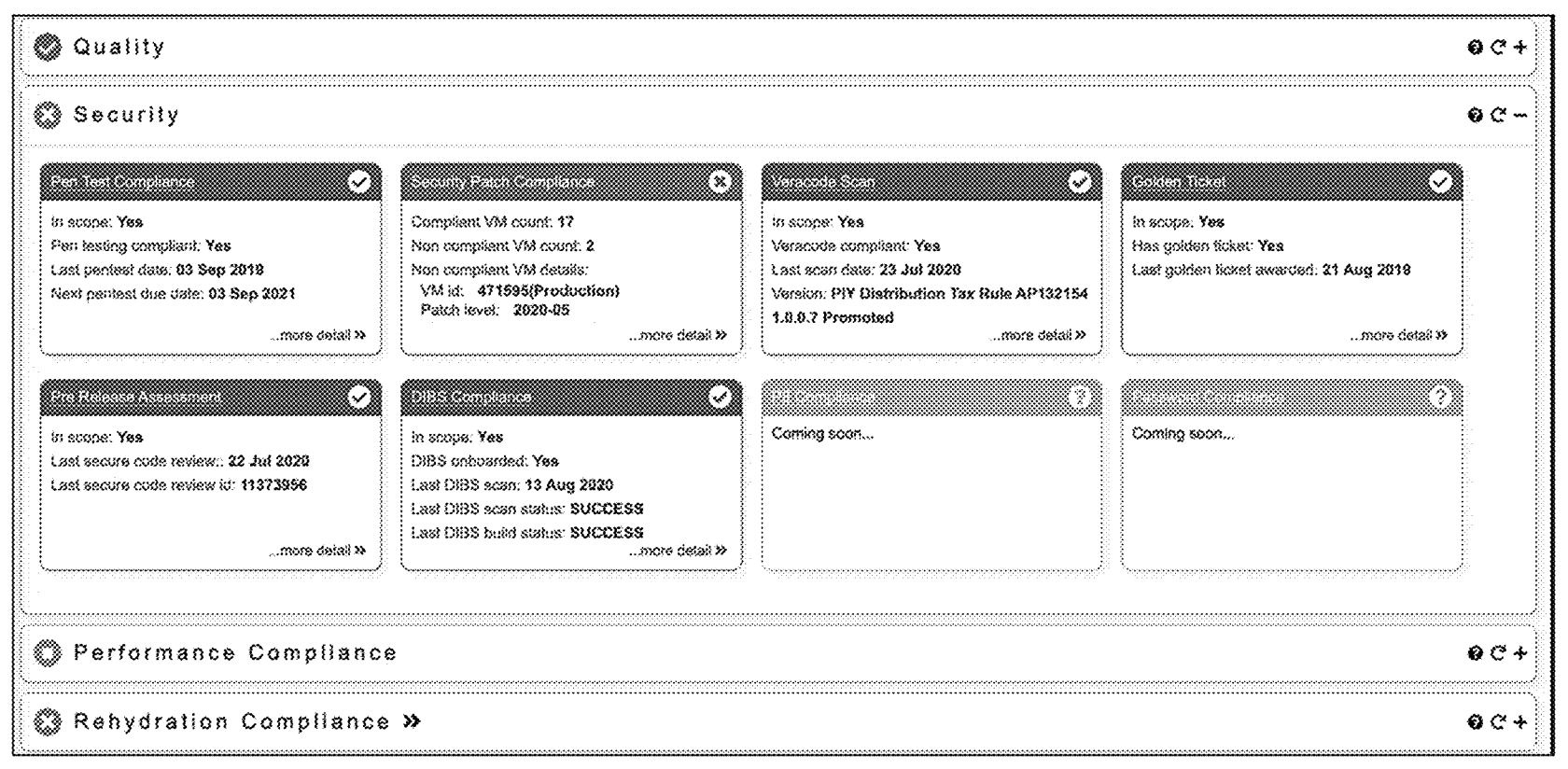

FIG. 10 is a diagram of an exemplary security analysis UI generated by the system 100. As shown in FIG. 10, the security analysis UI includes information relating to the security analysis and validation tests performed on the software application by, e.g., the software security analysis tool 122. Each section of the UI provides technical details of the corresponding security analysis, such as penetration testing compliance, security patch compliance, Veracode scan results, golden ticket status, pre release assessment status, and the like. Each section of the UI can be associated with a visual indicator (e.g., as shown, a checkmark or an 'x') indicating that the module 112 has (i) determined there are no problems or alerts with respect to each category of information that would prevent the application from being deployed or (ii) one or more issues were detected by the system 100, potentially impacting deployment of the application. As seen in FIG. 10, the security patch compliance section is associated with an 'x' indicator, which means the software application is non-compliant. The user at client device 102 can quickly see the reason for the non-compliance.

Figure 11:
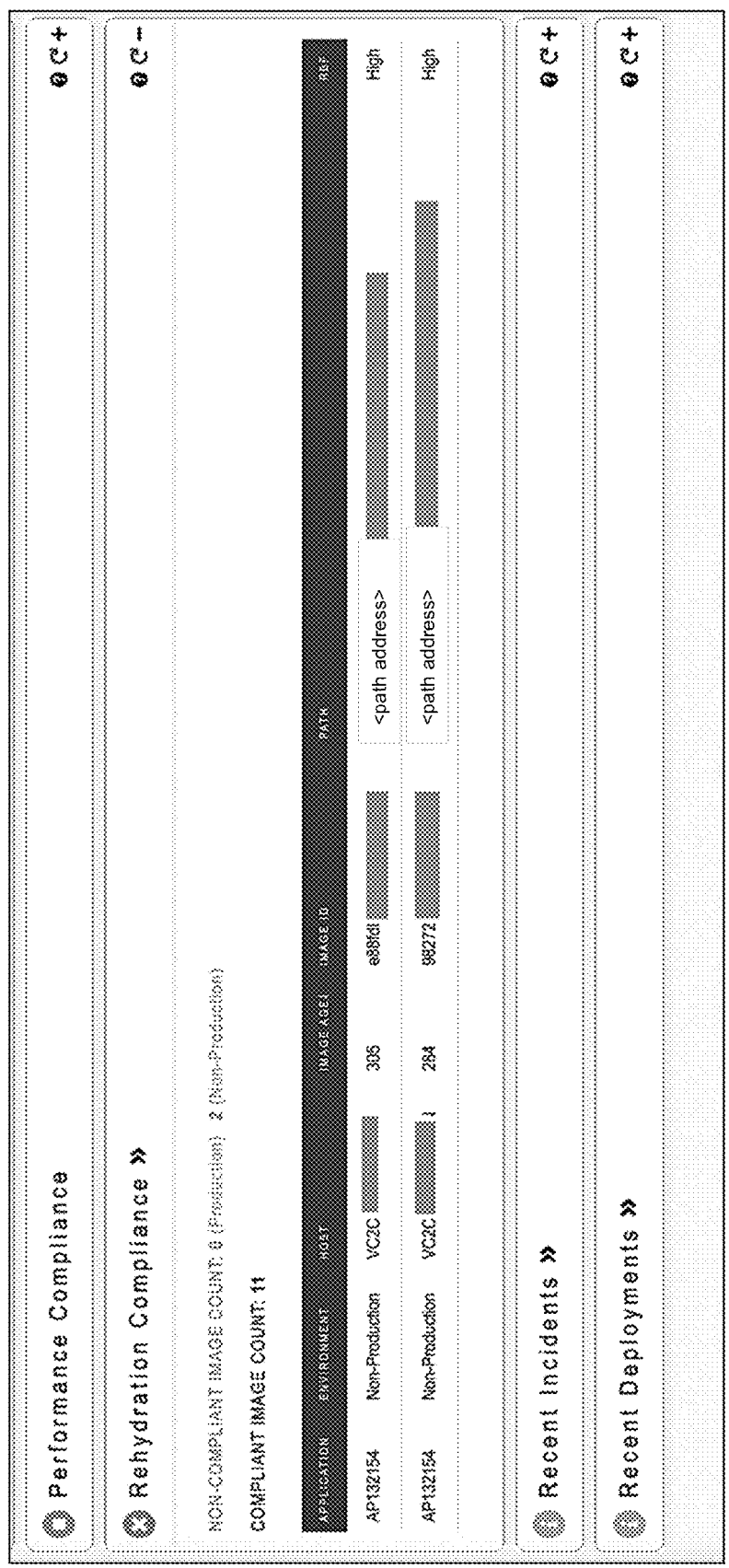
FIG. 11 is a diagram of an exemplary rehydration image compliance UI generated by the system.

FIG. 11 is a diagram of an exemplary rehydration image compliance UI generated by the system 100. As shown in FIG. 11, the rehydration image compliance UI provides details on any image compliance issues with the software application—such as images in development and/or production that are non-compliant with specific rehydration rules. A user at client device can see whether there are any non-compliant images (e.g., by the 'x' indicator at the top of the screen and/or the presence of data rows in the body of the UI. The presence of non-compliant images can factor into the release readiness score and whether the software application should be deployed to the production computing environment 126.

It should be appreciated that other types of information can be displayed to the user of client device 102 as part of the release readiness assessment beyond that described above with respect to FIG. 5-11.

As mentioned above, based upon the release readiness assessment and corresponding release readiness score generated by the release readiness analysis module 112, the system 100 can determine whether to deploy the software application to the production computing environment 126—or whether to prevent deployment of the software application. For example, when the release readiness score is at a certain value or threshold (e.g., a value indicating there are no significant issues detected that impact release readiness), the application deployment tool 120 deploys (210) the identified software application to the production computing environment 126. As mentioned above, the release readiness score can be a binary value (0 or 1), where a 0 score means the application can be deployed, while a 1 score means the application should be prevented from deployment. Upon receiving a release readiness score of 0 from the release readiness analysis module 112, the application deployment tool 120 can initiate execution of deployment of the software application to the production computing environment 126 (e.g., by installing and/or migrating necessary files, packages, libraries, APIs, and the like to one or more computing systems in the production environment). Based upon this deployment, the application deployment tool 120 can update relevant information in database 124 for the software application so that the release readiness analysis module 112 is aware of the deployment and it is reflected in subsequent evaluations of the same software application.

In some situations, the release readiness assessment may reveal issues or problems that would mitigate against deploying the software application to production—thus resulting in a release readiness score of 1. Upon receiving a release readiness score of 1 from the release readiness analysis module 112, the application deployment tool 120 can prevent (212) deployment (e.g., by cancelling a scheduled deployment) of the identified software application to the production computing environment 126. Based upon this cancellation, the application deployment tool 120 can update relevant information in database 124 for the software application so that the release readiness analysis module 112 is aware of the cancellation and it is reflected in subsequent evaluations of the same software application. In addition, in some embodiments, the application deployment tool 120 can transmit a notification of the cancellation to one or more remote devices (e.g., client device 102) so that developers can be aware that deployment did not occur.

Figure 12A:
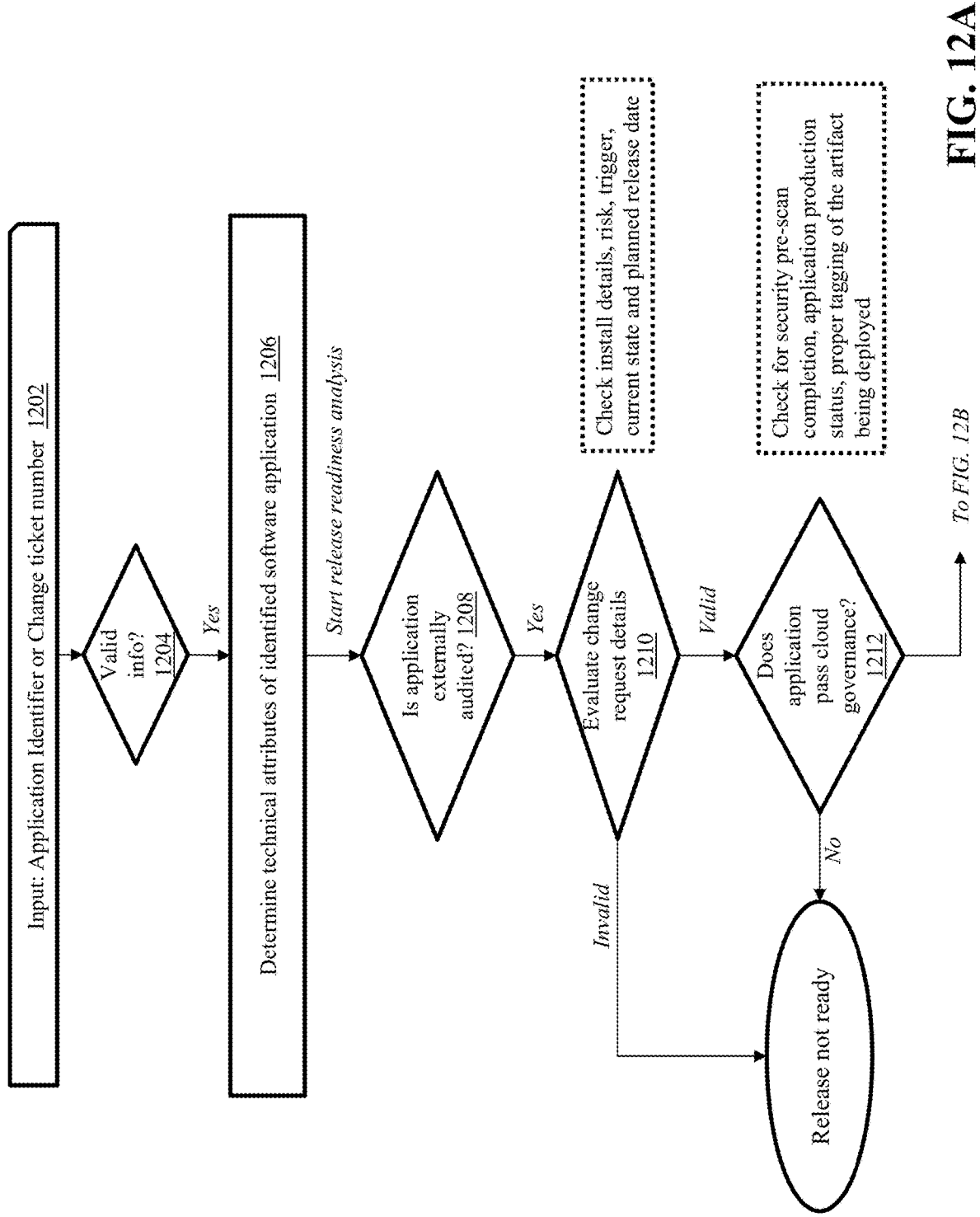
Figure 12C:
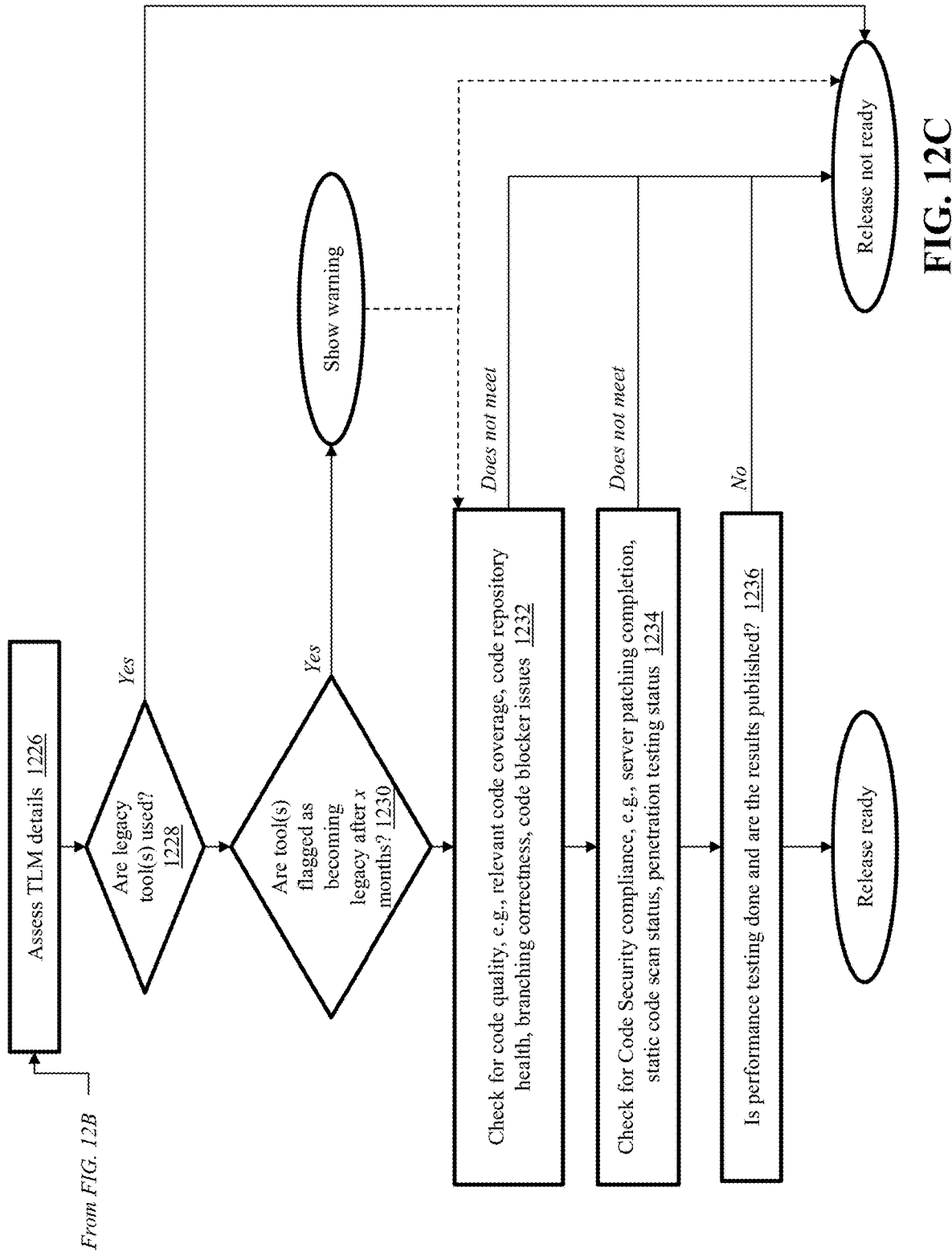

FIGS. 12A-12C comprise a use case flow diagram of an exemplary computerized method of assessing and auditing release readiness for a software application, using the system 100 of FIG. 1. Starting with FIG. 12A, the UI module 108 receives (1202) as input an application identifier and/or a change ticket number from client computing device 102 which relates to the software application or feature that is being assessed for deployment to the production computing environment. The data collection agent module 110 validates (1204) the received input to confirm that a software application exists with the corresponding application identifier, or that a software change exists with the corresponding change ticket number. The data collection agent module 110 then determines (1206) the technical attributes of the identified software application using the ALM tools 116, 118, 120, 122 as described in detail above with respect to FIG. 2. Once the technical attributes are determined, the release readiness analysis module 112 evaluates the technical attributes against a series of release readiness assessment criteria 1208, 1210, 1212, 1214, 1216, 1218, 1220, 1222, 1224, 1226, 1228, 1230, 1232, 1234, and 1236 to determine whether to deploy the software application to the production environment.

The release readiness analysis module 112 determines (1208) whether the software application is subject to external auditing. If so, the module 112 evaluates change request details for the software application, e.g., as obtained from the source code management tool 116 and/or the issue tracking and incident ticket tool 118. For example, the module 112 can check install details, deployment risk, deployment triggers, current state of the change request (e.g., not started, in development, in QA, complete), and a planned release date, among other attributes. If the release readiness analysis module 112 determines that any of (or a preponderance of) the change request details are invalid, then the module 112 can determine that the software application is not ready to be released (i.e., assign a release readiness score of 0) and end the readiness assessment process.

In the event that the change request details are valid, the release readiness analysis module 112 determines (1212)

whether the software application passes cloud governance requirements. For example, the module 112 can check for completion of a security pre-scan, determine application production status, evaluate whether one or more features or artifacts associated with the software application have proper tagging, and the like, e.g., using data obtained from the application deployment tool 120 and/or the software security analysis tool 122. If the release readiness analysis module 112 determines that the application does not meet the cloud governance requirements, then the module 112 can determine that the software application is not ready to be released (i.e., assign a release readiness score of 0) and end the release readiness assessment process.

Turning to FIG. 12B, when the application does pass the applicable cloud governance requirements, the release readiness analysis module 112 can check for release auditability 1214 (that is, whether the application can be properly audited after release). The module 112 determines (1216) whether release-related data has been added to the relevant ALM tools and/or database 124. For example, the module 112 can analyze source code tagging, location of artifacts, secure test result details, release change identifiers, functional validation results, and performance signoff (among other attributes) to determine whether the software application is auditable after release. If the module 112 determines that release-related data is missing, incomplete, or invalid, then the module 112 can determine that the software application is not ready to be released (i.e., assign a release readiness score of 0) and end the release readiness assessment process.

Next, the release readiness analysis module 112 can determine (1218) whether all relevant features (e.g., artifacts, libraries, build files, etc.) are properly linked in the software application. If the module 112 determines that all relevant features are not properly linked, then the module 112 can determine that the software application is not ready to be released (i.e., assign a release readiness score of 0) and end the release readiness assessment process. The release readiness analysis module 112 then evaluates (1220) whether all pre-install subtasks are assigned and completed, e.g., via the issue tracking and incident ticket tool 118. If, for example, certain subtasks were not assigned and/or not completed prior to assessment, the module 112 can determine that the software application is not ready to be released (i.e., assign a release readiness score of 0) and end the release readiness assessment process. If the subtasks are assigned and completed, the release readiness analysis module 112 can check (1222) for regulatory (e.g., OpsPro) compliance as described above. In this step, the module 112 can assess whether each relevant subtask was approved by the required IT owner and/or business product owner, e.g., via the application deployment tool 120. If there are approvals missing, for example, the module 112 can determine that the software application is not ready to be released (i.e., assign a release readiness score of 0) and end the release readiness assessment process.

Turning to FIG. 12C, in the event that the subtasks are properly approved, the release readiness analysis module 112 can assess (1226) technology lifecycle management details for the software application. For example, the module 112 can determine (1228) whether any legacy tool(s) are used in the software application. If so, the module 112 can determine that the software application is not ready to be released (i.e., assign a release readiness score of 0) and end the release readiness assessment process. Next, the module 112 can determine (1230) whether any tools used by the software application are flagged as transitioning to legacy status after a certain timeframe (e.g., x number of months). If so, the module 112 can generate a warning for display on client device 102. In some embodiments, the release readiness analysis module 112 can continue with the release readiness assessment (even when certain tools are flagged as transitioning to legacy status). In other embodiments, the module 112 can determine that the software application is not ready to be released if certain soon-to-be legacy tools are included in the software application (i.e., assign a release readiness score of 0) and end the release readiness assessment process.

The release readiness analysis module 112 then checks (1232) for source code quality including, e.g., relevant code coverage, code repository health, branching correctness, code blocker issues, and the like using, e.g., data obtained from the source code management tool 116. When the module 112 determines the source code quality falls below a desired level due to one or more problems with the above criteria, the module 112 can determine that the software application is not ready to be released (i.e., assign a release readiness score of 0) and end the release readiness assessment process.

Next, the release readiness analysis module 112 can check (1234) for code security compliance, such as server patching completion, static code scan status, and penetration testing status—among other criteria—using, e.g., data obtained from the software security analysis tool 122. If the module 112 concludes that the source code for the software application has not satisfied security compliance requirements, then the module 112 can determine that the software application is not ready to be released (i.e., assign a release readiness score of 0) and end the release readiness assessment process. As a final step in the use case, the release readiness analysis module 112 can assess (1236) whether performance testing of the software application has been performed and whether the results of such testing is published. If not, the module 112 can determine that the software application is not ready to be released (i.e., assign a release readiness score of 0) and end the release readiness assessment process. Otherwise, if the release readiness analysis module 112 determines that the software application has satisfied the necessary release readiness criteria as described above, the module 112 can determine that the software application is ready to be released (i.e., assign a release readiness score of 1) and end the release readiness assessment process—designating that the software application is ready to be deployed to the production computing environment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for assessing and auditing release readiness for a software application, the system comprising a server computing device with a memory that stores computer-executable instructions and a processor that executes the computer-executable instructions to:
receive identification of a software application to be deployed to a production computing environment;
determine a plurality of technical attributes of the identified software application from one or more application lifecycle management (ALM) tools, including at least a source code management system;
select one or more release readiness assessment criteria corresponding to the identified software application;
apply the plurality of technical attributes of the identified software application to the release readiness assessment criteria to generate a release readiness score for the software application;
deploy the identified software application to the production computing environment when the release readiness score is at or above a predetermined threshold; and
prevent deployment of the identified software application to the production computing environment when the release readiness score is below the predetermined threshold.

2. The system of claim 1, wherein the identification of a software application to be deployed to a production computing environment is received from a client computing device.

3. The system of claim 1, wherein the identification of a software application to be deployed to a production computing environment is automatically selected based upon a change management ticket received from a software development management system.

4. The system of claim 1, wherein the plurality of technical attributes of the identified software application comprise an application type, a migration path, an installation type, a source code repository identification, a deployment structure, and a cloud service provider identification.

5. The system of claim 1, wherein the one or more ALM tools comprise a software development management system, a source code vulnerability assessment system, a software security risk compliance system, a data warehouse system, and a software image management system.

6. The system of claim 1, wherein at least one of the one or more release readiness assessment criteria is based upon a regulatory requirement.

7. The system of claim 6, wherein the server computing device determines one or more regulatory-related attributes of the identified software application from the one or more ALM tools and applies the one or more regulatory-related attributes of the identified software application to the release readiness criteria to update the release readiness score.

8. The system of claim 1, wherein the server computing device generates one or more release readiness user interface screens based upon the application of the plurality of technical attributes of the identified software application to the release readiness assessment criteria and displays the release readiness user interface screens on a client computing device.

9. The system of claim 1, wherein when deployment of the identified software application to the production computing environment is prevented, the server computing device generates a notification message and transmits the notification message to one or more remote computing devices.

10. The system of claim 1, wherein the server computing device stores at least the release readiness score for each software application in an archival database.

11. The system of claim 1, wherein deploying the identified software application to the production computing environment comprises transferring one or more files of the identified software application to a computing device in the production computing environment and making functionality of the identified software application available to one or more remote computing devices.

12. A computerized method of assessing and auditing release readiness for a software application, the method comprising:
receiving, by a server computing device, identification of a software application to be deployed to a production computing environment;
determining, by the server computing device, a plurality of technical attributes of the identified software application from one or more application lifecycle management (ALM) tools, including at least a source code management system;
selecting, by the server computing device, one or more release readiness assessment criteria corresponding to the identified software application;
applying, by the server computing device, the plurality of technical attributes of the identified software application to the release readiness assessment criteria to generate a release readiness score for the software application;
deploying, by the server computing device, the identified software application to the production computing environment when the release readiness score is at or above a predetermined threshold; and
preventing, by the server computing device, deployment of the identified software application to the production computing environment when the release readiness score is below the predetermined threshold.

13. The method of claim 12, wherein the identification of a software application to be deployed to a production computing environment is received from a client computing device.

14. The method of claim 12, wherein the identification of a software application to be deployed to a production computing environment is automatically selected based upon a change management ticket received from a software development management system.

15. The method of claim 12, wherein the plurality of technical attributes of the identified software application comprise an application type, a migration path, an installation type, a source code repository identification, a deployment structure, and a cloud service provider identification.

16. The method of claim 12, wherein the one or more ALM tools comprise a software development management system, a source code vulnerability assessment system, a software security risk compliance system, a data warehouse system, and a software image management system.

17. The method of claim 12, wherein at least one of the one or more release readiness assessment criteria is based upon a regulatory requirement.

18. The method of claim 17, wherein the server computing device determines one or more regulatory-related attributes of the identified software application from the one or more ALM tools and applies the one or more regulatory-related attributes of the identified software application to the release readiness criteria to update the release readiness score.

19. The method of claim 12, wherein the server computing device generates one or more release readiness user interface screens based upon the application of the plurality of technical attributes of the identified software application to the release readiness assessment criteria and displays the release readiness user interface screens on a client computing device.

20. The method of claim 12, wherein when deployment of the identified software application to the production computing environment is prevented, the server computing device generates a notification message and transmits the notification message to one or more remote computing devices.

21. The method of claim 12, wherein the server computing device stores at least the release readiness score for each software application in an archival database.

22. The method of claim 12, wherein deploying the identified software application to the production computing environment comprises transferring one or more files of the identified software application to a computing device in the production computing environment and making functionality of the identified software application available to one or more remote computing devices.

\* \* \* \* \*